United States Patent [19]
Wajid

[11] Patent Number: 5,112,642
[45] Date of Patent: May 12, 1992

[54] MEASURING AND CONTROLLING DEPOSITION ON A PIEZOELECTRIC MONITOR CRYSTAL

[75] Inventor: Abdul Wajid, East Syracuse, N.Y.

[73] Assignee: Leybold Inficon, Inc., E. Syracuse, N.Y.

[21] Appl. No.: 505,668

[22] Filed: Mar. 30, 1990

[51] Int. Cl.⁵ .......................................... C23C 26/00
[52] U.S. Cl. ............................... 427/10; 427/100
[58] Field of Search ........................ 427/10, 100

[56] References Cited

U.S. PATENT DOCUMENTS

| | | | |
|---|---|---|---|
| 3,528,851 | 9/1970 | Koneval | 427/100 |
| 3,655,429 | 4/1972 | Deklerk | 427/10 |
| 4,205,117 | 5/1980 | Nishiyama | 427/100 |
| 4,343,827 | 8/1982 | Thompson | 427/10 |
| 4,484,382 | 11/1984 | Kawashima | 427/100 |
| 4,676,993 | 6/1987 | Roberts | 427/10 |
| 4,792,463 | 12/1988 | Okada | 427/100 |
| 4,817,430 | 5/1989 | Benes et al. | |
| 4,870,313 | 9/1989 | Hirama | 310/326 |

OTHER PUBLICATIONS

Anderson, Spurious Modes in AT-Cut Quartz Crystals, Proceedings of the 17th Annual Freq. Control Symposium, 1963-pp. 312-313.
Sauerbrey, Investigation of Resonant Modes of Planoconvex AT-Plates, Proceedings of the 21st Annual Freq. Control, 1967, pp. 63-71.
V. Bottom, Introduction to Quartz Crystal Unit Design Van Nostrand, 1982-p. 75.
D. Salt, Hy-Q Handbook of Quartz Crystal Device VanNostrand, 1988-pp. 157 & 51.
Benes, et al., Enhanced Composite Resonator Analysis, Proceedings of the 39th Annual Symposium on Freq. Control pp. 1-15.
Nowotny, et al., General One-dimensional Treatment of the Layered Piezoelectric Resonator with two Electrodes, J. Acoust. Soc. Am 82 (2), Aug. 1987, pp. 513-521.
Benes, et al., Process in Monitoring Thin Film Thickness by Use of Quartz Crystals, Thin Solid Films 174 (1989) pp. 307-314.
M. Schmid, et al., A Computer-Controlled System for the Measurement of Complete Admittance Spectra of Piezoelectric Resonators-Meas. Sci. Tech. 1 (1990).
J. de Klak "C Axis Flipping, For Multilayer Piezoelectric Thin-Film Transducers" Applied Physics Letters, vol. 13, No. 3, Aug. 1, 1968, pp. 102-104.
Tierston & Smythe An Analysis of Contured Crystal Resonators Operating in Overtones of Coupled Thickness Shear and Thickness Twist J. Acoust. Soc. Am. 65(6), Jun. 1979-1455-1460.
Benes Improved Quartz Crystal Microbalance Technique J. Appl. Phys. 56(3) Aug. 1984 608-626.

Primary Examiner—Shrive Beck
Assistant Examiner—Vi Duong Dang
Attorney, Agent, or Firm—Wall and Roehrig

[57] ABSTRACT

The thickness and rate of growth of a deposited film is monitored using a piezoelectric crystal sensor such as an AT-cut plano-convex crystal. The frequencies of the fundamental frequency and another resonance mode are measured prior to deposition, and the change of these two frequencies is monitored during deposition. The areal mass density of the deposited material is determined from these two resonance frequencies for the uncoated quartz crystal and for the crystal during deposition. A frequency generator provides accurate sweeps of frequency which are applied to the crystal, and the crystal response is supplied to a phase detector to identify the positions of the resonance frequencies. The acoustic impedance ratio Z of the deposited material relative to the fresh crystal is computed from the resonance frequencies for the coated and uncoated crystal, by applying the modal equations for AT-cut plano-convex quartz crystal and Lu-Lewis relation. From the frequency shifts and acoustic impedance ratio, and areal mass density can be calculated. The same crystal can be used to control the growth rate of several successive layers.

8 Claims, 1 Drawing Sheet

MEASURING AND CONTROLLING DEPOSITION ON A PIEZOELECTRIC MONITOR CRYSTAL

BACKGROUND OF THE INVENTION

This invention relates to the measurement of thickness of a coating of a material on a substrate, and to the measurement and control of the rate of deposit of the material. The invention is more particularly directed to a method of measuring the amount of material being deposited upon a piezoelectric crystal by monitoring predetermined resonance frequencies and monitoring changes in those resonance frequencies.

Monitoring and controlling of the growth rate of thick or thin films, especially those deposited by vapor deposition or sputtering, is important in maintaining the quality of the devices produced in this manner. Quartz crystal deposition monitors have typically been employed for this purpose. Most usually, such monitors utilize the thickness shear wave mode of an AT-cut piezoelectric quartz crystal to monitor the rate of growth of thin films. In a typical arrangement, a quartz crystal with appropriate electrodes is placed in the feedback loop of a suitably designed oscillator circuit as a frequency control element. The equivalent electrical admittance of the quartz crystal is a maximum at its series resonance frequency, so the oscillator output tends to maintain itself at that frequency. Consequently, any change in the series resonance frequency of the crystal produces a corresponding change in the oscillator output frequency. The quartz crystal is physically positioned within an evaporation chamber or sputtering chamber where it is exposed to evaporants. As the evaporants condense on the surface of the quartz crystal, the mass of the crystal increases and its resonance frequency or frequencies decrease. While the quartz crystal can be made to oscillate in many different modes, the thickness shear wave mode is the most convenient for its mass-sensing properties.

The vibrating crystal is coated in proportion to the coating on other substrates in the chambers and the reduction in its resonance frequency on account of mass loading is indicative of the coating thickness on the crystal. Thus, the shift in crystal resonance frequency also indicates the coating thickness on the substrates. The resonance frequency is a highly sensitive measure of the applied coating thickness. Any changes in resonance frequency over time indicate the coating or deposition rate, i.e., change in thickness per unit time. Because the resonance frequency changes depend on the mass of the deposited material that has been added to the crystal, these quartz crystal monitors are often referred to as quartz crystal microbalances or microscales.

In a typical quartz crystal microbalance system, the useful lifetime of the sensing crystal is rather limited. The accumulation of deposition on the crystal surface reduces the sharpness and quality of the resonances, and sooner or later the crystal is no longer able to sustain vibration. At that time, the crystal must be replaced, or else controlled deposition cannot be continued. If crystal failure occurs during the deposition of a particular layer, it may be necessary to scrap the entire work product, with significant loss in investment to that point.

Various procedures to predict useful life until crystal failure has been proposed, e.g. as discussed in U.S. Pat. No. 4,817,430, so that the crystal can be replaced before its degradation can cause a problem. However, these techniques do not permit a degraded crystal to continue in use.

Current approaches to quartz crystal microbalances do not permit use of the same crystal to monitor and control the deposition of multiple layers of different materials. However, in many types of devices, such as multi-material optical devices or superconducting thin film devices, a sequence of layers must be laid down to rather precise specifications. In such applications, the conventional approach is to employ several multiple crystals in individually shuttered sensor heads, each head dedicated to a specific material, each head with its own tooling factor, and each crystal with its own resonance characteristics. Alternatively, it is possible in some processes to break vacuum, open the chamber, and change crystals for each layer of film. In either case, the expense and time constraints are high, and the processes are susceptible to operator error.

Operation of modern quartz crystal microbalances can be based on the so-called Lu-Lewis relation, which takes into account not only the mass density of the crystal, but also the acoustic impedance mismatch at the quartz-film interface. An example of this technique is "Z-match," a trademark of Leybold Inficon, Inc. This has resulted in improved performance, especially in the case of thick-film depositions. The Lu-Lewis relationship can be expressed simply as follows:

$$Z_Q \tan \frac{f}{f_Q} \pi + Z_F \tan \frac{f}{f_F} \pi = 0$$

where f is the composite resonance frequency, $f_Q$ and $f_F$ are the mechanical resonance frequencies of the crystal and film, respectively, and $Z_Q$ and $Z_F$ are the specific acoustical impedances of the crystal and film, with respect to a piezoelectrically excited shear wave. This relation yields an explicit mass load versus frequency relation:

$$\frac{M_F}{M_Q} = \frac{-Z_F f_Q}{Z_Q \pi f} \cdot \arctan\left(\frac{Z_Q}{Z_F} \tan \frac{\pi f}{f_Q}\right)$$

where $M_F$ and $M_Q$ are the areal mass densities of the film and the quartz crystal, respectively. This ratio is indicated by m in subsequent text.

The principal drawback to the use of this equation is the need to know the value of the acoustic impedance ratio $Z = Z_Q/Z_F$. This can be looked up for some bulk materials, but the effective Z value in films deposited at different rates or to different thicknesses or for films comprised of layers of several materials is not well known and is not entirely predictable.

As aforesaid, the acoustic impedance ratio, or Z-ratio, for the bulk material is often quite different from that of the thin film, which is more sensitive to process parameters. For many rather exotic materials, the Z-ratio is simply not known. In such cases it is possible to set the Z-ratio to unity, but this false premise introduces errors in thickness and rate measurements, the magnitude of the error depending on the departure of the true Z-value from unity, as well as on the film thickness.

In addition, the current "Z-match" approach is not capable of accurate measurement of thickness for multiple layers. While in principle a single Z-match technique could be applied to multiple layers where the acoustic impedance of each layer is known, in practice that technique is regarded as far too cumbersome to be implemented. See C. Lu and A. W. Czanderna, *Applications of Piezoelectric Quartz Crystal Microbalances*; Elsevier, N.Y. 1984. The complexity of the mathematical analysis increases rapidly in respect to the number of layers involved, so that it is less practical than to track the deposition process with multiple crystals, with only a single material being deposited on a specific crystal.

A previous approach using the acoustic impedance ratio, $Z = Z_Q/Z_F$, is to employ not only the quartz crystal fundamental frequency, but also a selected overtone or higher-frequency resonance. This approach is referred to as "Auto Z match." Typically, a quasiharmonic having approximately three times the fundamental frequency is used as the upper frequency. The two frequencies are sequentially applied to predict the impedance ratio or Z-ratio. The basics of this approach are discussed in E. Benes, *Improved Quartz Crystal Microbalance Technique*, J. Appl. Phys. 56, Aug. 1, 1984, pages 608 to 626.

Also with respect to the two-frequency method of measuring the effective Z ratio, as described in the Benes article, a two-frequency oscillator is needed to detect two resonance frequencies that are in the ratio of 1:3 or 1:5. This method also requires the simultaneous solution of two non-linear equations that may not always converge to a unique solution. Also, the required plano-plano-convex crystal two-frequency oscillator tends to be too noise-prone to be useful: the electrical admittance of the plano-convex crystal at higher quasi harmonic resonances drops off rather rapidly, approximately as the square of the frequency ratio, so that the sensitivity to a third-order resonance is at most one-ninth that of the fundamental. This makes it enormously difficult to obtain accurate readings of the higher frequency modes, especially as there are several quasi-harmonic and anharmonic modes situated close to one another on the frequency spectrum.

It has not previously been possible to find two distinct mass-load-sensitive vibrational modes for a given quartz crystal within a short period of time, and without the assurance of not being trapped on another mode. Also, it has been impossible to isolate in real time the various vibrational modes of a quartz crystal after there has been material deposited to the point at which the crystal resonance can no longer drive an oscillator.

OBJECTS AND SUMMARY OF THE INVENTION

Accordingly, it is an object of this invention to determine the thickness of a film that is condensed and adhered to the surface of a piezoelectric crystal, regardless of how deposited.

It is another object of this invention to monitor simultaneously two resonance modes of the crystal and to provide an indication of the thickness of each of any numbers of layers of material deposited thereon.

It is a further object of this invention to provide accurate measurement of the thickness of successive multiple films of different materials, employing a single piezoelectric monitor crystal.

In accordance with an aspect of the invention, the rate of deposition of material onto a piezoelectric crystal is measured and controlled by monitoring a fundamental resonance frequency $f_1$ and another resonance frequency $f_2$ above the resonance frequency $f_1$. These resonances are at predetermined frequencies $f_{1u}$ and $f_{2u}$ before any of the material is deposited on the uncoated crystal, but these resonances shift to lower frequencies $f_{1c}$ and $f_{2c}$ under mass loading of the crystal as the material is deposited on it. A frequency synthesizer or other frequency generator applies sweeps of frequencies to the crystal as the material is being deposited on it. A response signal from the crystal is processed to identify the shifted fundamental frequency $f_{1c}$ and the shifted anharmonic frequency $f_{2c}$. The frequency sweeps and the analysis for the frequencies $f_{1c}$ and $f_{2c}$ are continued over the deposition process. The areal mass density m of the coating material is computed, based on the initial or uncoated crystal resonance frequencies $f_{1u}$ and $f_{2u}$ and on the shifted resonance frequencies $f_{1c}$ and $f_{2c}$ for the crystal that is undergoing coating. The rate of material deposit is then determined based on changes in the areal density m for sweeps of frequency.

This rate information is then supplied to a processor to control the rate of material deposit, e.g., by adjusting current to an evaporation furnace, or controlling the thickness by operating a shutter device.

In a preferred mode, the areal density, m, is carried out by calculating parameters $R_{uncoated}$ and $R_{coated}$, where $$R_{uncoated} = \frac{f_{2u}^2 - f_{1u}^2}{f_{1u}^2}$$

and $$R_{coated} = \frac{f_{2c}^2 - f_{1c}^2}{f_{1c}^2}.$$

These parameters are applied to the following approximation to determine a value (mz) which is the product of the areal density, m, times the acoustic impedance ratio, z, of the coating deposited material relative to the quartz crystal, $$\frac{R_{coated}^2}{R_{uncoated}^2} \approx (1 + mz)^{-1}.$$

The value of the quantity (mz) is then applied to the Lu-Lewis equation to yield the acoustic impedance ratio, z:

$$z = \frac{-\tan(mz \cdot \pi f_{1c}/f_{1u})}{\tan(\pi \cdot f_{1c}/f_{1u})}.$$

With both z and mz being known, the areal density m can be easily calculated.

In the preferred embodiment, the piezoelectric crystal is an AT-cut planoconvex quartz crystal. However, for suitable applications other piezoelectric crystals could be employed according to the same principles. In the case of the AT quartz crystal, the lowest, fundamental frequency corresponds to a mode [1,0,0] for crystal vibration, where the indices respectively indicate the number of phase reversals along the three crystal axes. The next lowest frequency resonance corresponds to an anharmonic [1,0,2] mode, and these two resonances are employed as the frequencies $f_1$ and $f_2$. The resonance at the [1,0,2] mode is situated close above the [1,0,0] resonance, and so is a much stronger resonance than other possible resonances, such as the [3,0,0] resonance that is used in the two-frequency analysis mentioned earlier.

The frequency measurements are carried out to an accuracy of a few hertz, and preferably to within one hertz or better. An active frequency synthesizer can produce driving signals at programmed frequencies, through a hybrid circuit, to the quartz crystal. As the frequency changes, the phase response of the crystal changes, with 90° phase shifts occurring at resonance peaks. The hybrid circuit passes the response signal from the quartz crystal to a signal processing circuit which shapes it and feeds it to a phase detector. A reference signal that is in phase with the drive signal is applied to another terminal of the phase detector. The latter provides accurate indication of the positions of the various resonances along the frequency spectrum, from which the resonance frequencies and the rate of frequency shift can be determined. The frequencies $f_{1c}$ and $f_{2c}$ can be accurately measured up to several hundred times per second to give quite accurate measure of the rate of growth of the deposited layer or layers.

Where a second or subsequent layer of material is being deposited on another layer, the technique of this invention can be used to measure the total amount of material deposited on the crystal, and then the amount of new material can be ascertained by accounting for the material in the previous layer or layers. To this end the areal density, m, for the previously deposited material is stored and the procedure as described above is repeated during the deposition of the new material. The frequency generator makes successive sweeps of frequencies, and the response characteristics of the crystal is analyzed to identify the frequencies $f_{1c}$ and $f_{2c}$. The aggregate areal density is computed for the total of the several layers, and the difference between this value and the stored areal density value represents the areal density of the new material in what is now the topmost layer. A large number of layers can be deposited and controlled using only a single crystal, and without need to break vacuum or to change crystals.

The above and many other objects, features, and advantages of this invention will become apparent from the ensuing description of a preferred embodiment, which should be read in connection with the accompanying Drawing:

BRIEF DESCRIPTION OF THE PREFERRED EMBODIMENT

Figure 1:
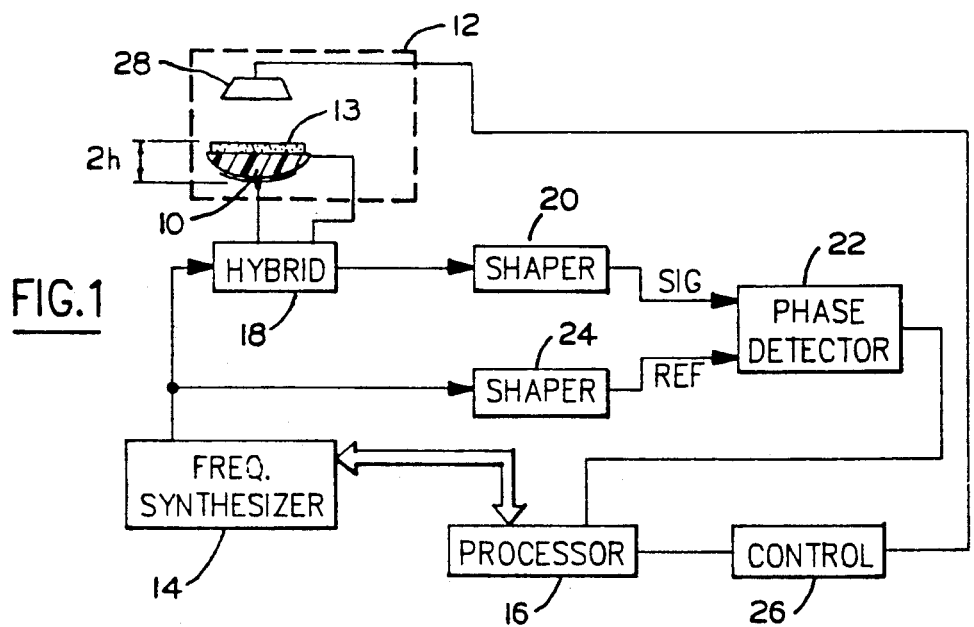
FIG. 1 is a schematic view of a quartz crystal microbalance monitor and control circuit according to one embodiment of this invention.

With reference initially to FIG. 1 of the Drawing, a piezoelectric crystal 10, in this case an AT-cut quartz crystal, is employed as a microbalance film thickness sensor within a vacuum deposition chamber 12, represented in ghost lines. Either or both faces of the crystal can be contoured, i.e., given a spherical shape. This has the effect of increasing the separation between various mode frequencies and preventing transfer from one vibrational mode to another. This effect is commonly known as energy trapping through contouring. As a consequence of contouring and simple electrode configuration, electrical stimulation produces a mode of vibration that is a thickness shear mode coupled with thickness twist motion, rather than a pure thickness shear motion. The mode with the minimum degree of twist has the lowest resonance frequency and the highest electrical admittance. This is commonly considered the "fundamental" mode. Located at frequencies close above the fundamental mode are two other modes which have larger contributions from thickness twist motion, and these are considered anharmonic modes. If the modes are assigned indices $[n_x, n_y, n_z]$ to correspond to the number of phase reversals in the wave motion along the three crystal axes, then the three lowest resonance frequencies, in order, are at the fundamental mode [1,0,0], and the two nearby anharmonic modes [1,0,2] and [1,2,0]. There are numerous other modes, both quasi-harmonic modes (which are approximate multiples of the fundamental mode) and also anharmonic modes which are present in the vibrating crystal. However, for the discussion of the preferred embodiment of this invention, the only modes that need to be considered are the thickness shear fundamental mode [1,0,0] and the next lowest anharmonic mode [1,0,2]. The other modes are potentially useful for other embodiments, but need not be discussed here.

Figure 2:
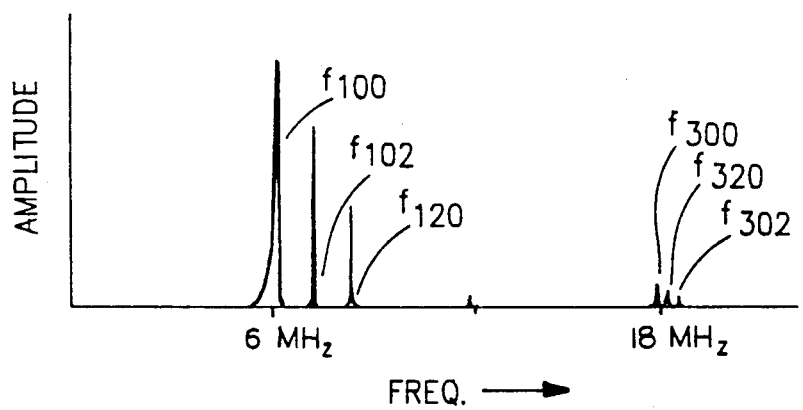
FIG. 2 is a chart showing the relative positions of several crystal resonances of interest, for explaining the principles of this invention.

The frequencies at resonance for these various modes can be identified with the subscripts to match the mode indices, i.e, the fundamental frequency for the mode [1,0,0] is identified as $f_{100}$, the first anharmonic resonance frequency for the mode [1,0,2] is $f_{102}$ and resonances at other modes [1,2,0], [3,0,0], [3,0,2], [3,2,0], for example are $f_{120}$, $f_{300}$, $f_{302}$, and $f_{320}$. As shown in FIG. 2, the amplitudes of these resonances are more or less inversely related to the square of the frequency, so that the strength of the resonance at $f_{300}$ is only about one-ninth that of the fundamental resonance. On the other hand, the anharmonic resonance at $f_{102}$ is correspondingly larger, because of its proximity to the fundamental frequency $f_{100}$.

As a film 13 of material is deposited upon the exposed face of the crystal 10, the entire spectrum of resonances, in general, shifts to lower frequencies. It has been observed that the three modes [1,0,0], [1,0,2], and [1,2,0] have slightly different frequency shifts on account of material accumulation. This difference in frequency shift for the two modes [1,0,0] and [1,0,2] can be used to estimate the acoustic impedance ratio or Z-ratio for the material.

Figure 3:
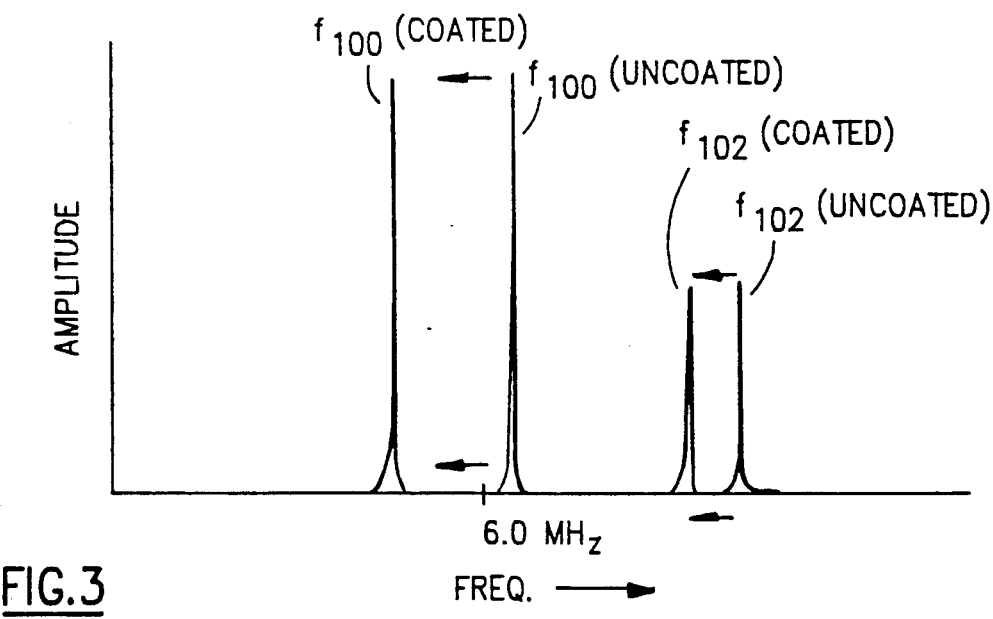
FIG. 3 is a chart showing the relative mass-load frequency shifts for two crystal resonances.

As shown in FIG. 3, the shift in frequencies for the fundamental and anharmonic modes in the uncoated crystal $f_{100\text{-}uncoated}$ and $f_{102\text{-}uncoated}$ to the corresponding modes in the crystal undergoing coating, $f_{100\text{-}coated}$, and $f_{102\text{-}coated}$, can be measured to show different rates of frequency shift. The different rates of frequency shift for the two modes come about because of different elasticity constants in the crystal namely $C_{66}$ and $C_{55}$.

As discussed in Tiersten and Smythe, An Analysis of Contoured Crystal Resonators Operating in Overtones of Coupled Thickness Shear and Thickness Twist, *J. Acoust. Soc. Am.* 65, June 1979, pages 1455 to 1460, the observed frequencies $f_{100}$ and $f_{102}$ can be used to calculate the ratio of the elastic constants. The expressions for the squares of the frequencies of the [1,0,0] and [1,0,2] modes respectively are $$f_{100}^2 = \qquad\qquad\qquad (1)$$

$$\left(\frac{C_{66}}{16h^2\rho}\right)\left(1 - \frac{1}{\pi}\cdot\sqrt{\frac{2h}{r}}\cdot\left[\sqrt{\frac{M_1}{C_{66}}} - \sqrt{\frac{C_{55}}{C_{66}}}\right]\right)$$

and $$\hat{f}_{102} = \qquad (2)$$

$$\left(\frac{C_{66}}{16h^2\rho}\right)\left(1 - \frac{1}{\pi}\cdot\sqrt{\frac{2h}{r}}\cdot\left[\sqrt{\frac{M_1}{C_{66}}} - 5\sqrt{\frac{C_{55}}{C_{66}}}\right]\right)$$

where $C_{55}$, $C_{66}$, and $M_1$ are adjusted elastic constants for the AT-cut quartz crystal (See Tiersten and Smythe for a detailed explanation); We are extending this theory to the case of composite resonators. Then the above elastic constants represent effective values for the composite of quartz and film material (if present).

r is the radius of curvature of the contour;

2h is the thickness of the crystal 10 and adheral film 13 at its center; and p is the effective density of the quartz and film, if present From the above, a parameter R can be calculated $$R = \frac{\hat{f}_{102} - \hat{f}_{100}}{\hat{f}_{100}} \qquad (3)$$

$$= \frac{\sqrt[4]{C_{55}/C_{66}}\cdot\left(\frac{1}{\pi}\cdot\sqrt{\frac{2h}{r}}\right)}{1 - \frac{1}{\pi}\cdot\sqrt{\frac{2h}{r}}\cdot\left[\sqrt{\frac{M_1}{C_{66}}} - \sqrt{\frac{C_{55}}{C_{66}}}\right]} \qquad (4)$$

This parameter R changes dynamically with deposition of material. The parameters $R_{uncoated}$ for the fresh, uncoated crystal and $R_{coated}$ for the coated crystal are related according to the following:

$$\frac{R^2_{coated}}{R^2_{uncoated}} =$$

$$\frac{(C_{55}/C_{66})\text{ coated}}{(C_{55}/C_{66})\text{ uncoated}} = \frac{(C_{55})\text{ coated}}{(C_{55})\text{ uncoated}} \bigg/ \frac{(C_{66})\text{ coated}}{(C_{66})\text{ uncoated}}$$

In a digital implementation, one can keep track of residual correction factors, neglected from denominator of e.g. (4) but for purposes of this discussion, the above approximation is considered sufficiently accurate.

At this stage, apart from a minor correction factor that signifies progressively increasing composite resonator thickness, the above ratio $$\frac{R^2_{coated}}{R^2_{uncoated}}$$

approximately equals the inverse of (1+mz) where m is the areal mass density, i.e., the ratio of film mass to quartz mass per unit area, and z is the z-ratio, defined as the ratio of specific acoustic impedance of quartz to that of the film material.

$$\frac{R^2_{coated}}{R^2_{uncoated}} = (1 - mz)^{-1} \qquad (6)$$

The correction factor provides a rough estimate of the ratio of thickness of bare quartz crystal to that of the composite resonator (crystal and film). An implementation algorithm is appended as an attachment.

The quantity mz also appears in the Lu-Lewis relation, and can be used to obtain an estimate of the effective Z-ratio. The Lu-Lewis relation is expressed as follows:

$$\tan(mz\cdot\pi\cdot f_{100c}/f_{100u}) + z\cdot\tan(\pi\cdot f_{100c}/f_{100u}) = 0 \qquad (7)$$

or $$z = -\frac{\tan(mz\cdot\pi\cdot f_{100c}/f_{100u})}{\tan(\pi f_{100c}/f_{100u})} \qquad (8)$$

Here, $f_{100c}$ and $f_{100u}$ are the fundamental resonance frequencies for the coated and uncoated crystal, respectively.

Because of the multi-valued nature of the trigonometric functions involved here, the value of the z-ratio is not always a positive quantity. However, the areal density m is always uniquely defined for a given estimated z-ratio and a given frequency shift. Thickness and deposition rate are easily calculated from the value of the areal density m.

With the above described technique care must be taken to measure the frequencies rather precisely. Since the z-ratio estimate depends on the frequency shifts for the two modes [1,0,0] and [1,0,2], spurious shifts due to mechanical or thermal stress on the crystal can produce erroneous readings. Also, the possibility of "mode hopping," i.e., erroneously reading another mode, i.e., the [1,2,0] mode for the [1,0,2] mode, can produce errors in z-ratio. However, the inventors have successfully tested this technique on both 2-diopter 6 MHz crystals and 4.5 diopter 4 MHz crystals using various materials, i.e., metals, dielectrics, and sandwich layers. The thickness estimates from this technique have been consistently accurate and dependable.

The technique described hereinabove can be practiced effectively on an intelligent microbalance circuit as illustrated in FIG. 1, and as described in greater detail in copending U.S. patent application Ser. No. 464,371, filed Jan. 12, 1990, and having a common assignee herewith. In this arrangement, as aforementioned, the quartz crystal 10 has one face exposed to vapors within the deposition chamber 12. A frequency generator 14 is favorably a direct digital synthesizer that is controlled by a digital processor unit 16. This frequency generator can produce an RF drive signal at a frequency resolution of 0.005 Hz in a frequency range of 0 to 8.0 MHz. This precision RF drive signal is supplied to an input of a hybrid circuit 18 that has one output connected to the crystal 10. The hybrid circuit 18 serves as a duplexer and supplies the RF drive signal to the piezoelectric crystal 10. A return signal or response from the crystal 10 is then supplied from another output of the hybrid circuit to a wave shaper 20, which can take the form of a signal amplifier and limiter. The wave shaper 20 supplies a crystal output signal SIG to one input of a phase detector 22. Another wave shaper 24 has an input connected to receive the RF drive signal, and supplies a reference wave REF, that has the same phase and frequency as the RF drive signal, to a second input of the phase detector 22. The phase detector 22 has a phase output whose value depends on the phase relationship between the signals SIG and REF.

When the applied RF drive signal as generated in the frequency synthesizer 14 is at a resonance frequency of the crystal 10, there is a ninety-degree phase shift between the reference signal REF and the response signal SIG that is returned through the hybrid circuit 18.

At frequencies several hundred hertz below crystal resonance, there is a phase shift of substantially zero degrees between the applied and response signals. At frequencies several hundred hertz above crystal resonance, there is a phase shift approaching one hundred-eighty degrees. The output of the phase detector 22 will be zero when the applied signal REF leads the return signal SIG by 90°, but will otherwise be a positive or negative voltage level in accordance with the difference in phase between the signals REF and SIG. A discrete sign change is encountered when the synthesized applied RF signal is frequency-swept through each resonance. This phase information can be provided, in suitable digital form, to the processor 16. The processor is programmed with a suitable strategy to track and monitor at least the fundamental frequency $f_{100}$ and the lowest anharmonic $f_{102}$, and to maintain the frequency sweep rate of the synthesizer 14 so as to continuously monitor the drift rates of these two modes.

By tracking the frequencies $f_{100c}$ and $f_{102c}$ of the coated quartz crystal 10 and applying previously determined frequencies $f_{100u}$ and $f_{102u}$ for the uncoated crystal, changes in areal density m can be monitored, and this can yield the rate of growth of the layer of material being deposited. This rate information is applied by the processor 16 to operate a control circuit 26 that in turn controls the evaporation rate of a vapor source 28 in the chamber 12.

The technique can be employed for measuring the thickness of and controlling single film depositions, or for measuring and controlling successive multiple films of different materials with only one monitor crystal. This technique can also be employed for controlling and measuring the deposition of co-deposited multiple material film, i.e., an alloy, regardless of its stoichiometry. In a suitable environment, it is also possible to employ this technique to measure mechanical properties, e.g. density, viscosity, or acoustic impedance, of a liquid if the monitor crystal is immersed in or exposed to the liquid.

It is possible to practice the principles of this invention with crystals other than AT-cut quartz crystals, or by tracking the mass loading behavior of modes other than the [1,0,0] and [1,0,2] modes. The invention is not limited to the details of the embodiment described hereinabove. Rather, many modifications and variations will present themselves without departure from the scope and spirit of this invention, as defined in the appended claims.

What is claimed is:

1. A method of measuring and or controlling the ate of material deposition onto a piezoelectric crystal that has a fundamental resonance frequency $f_1$ and at least one additional nearby anharmonic resonance frequency $f_2$ next above said fundamental resonance frequency, said fundamental and anharmonic resonance frequencies having predetermined initial frequencies $f_{1u}$ and $f_{2u}$ prior to any material being deposited on the crystal, and shifting to lower frequencies $f_{1c}$ and $f_{2c}$ under mass loading of the crystals as the material is deposited thereon, the method comprising:

generating successive sweeps of frequencies in a frequency generator and applying said sweeps of frequencies to said crystals as said material is being deposited thereon;

analyzing a response characteristic of said crystal to said sweeps of frequencies to identify the shifted fundamental resonance frequency $f_{1c}$ and the shifted anharmonic resonance frequency $f_{2c}$ for the crystal as it is being coated;

computing an areal mass density m of the coating of material on the crystal based on the initial resonance frequencies $f_{1u}$ and $f_{2u}$ for the uncoated crystal and the shifted resonance frequencies $f_{1c}$ and $f_{2c}$ for the crystal being coated;

computing the rate of material deposit based on changes in said areal mass density m for successive sweeps of frequencies; and controlling the rate of material deposition based on the computed rate of material deposit.

2. A method of measuring and or controlling the rate of material deposition onto a piezoelectric crystal that has a fundamental resonance frequency $f_1$ and at least one additional resonance frequency $f_2$ next above said fundamental resonance frequency, said fundamental and additional resonance frequencies having predetermined initial frequencies $f_{1u}$ and $f_{2u}$ prior to any material being deposited on the crystal, and shifting to lower frequencies $f_{1c}$ and $f_{2c}$ under mass loading of the crystals as the material is deposited thereon, the method comprising:

generating successive sweeps of frequencies in a frequency generator and applying said sweeps of frequencies to said crystals as said material is being deposited thereon;

analyzing a response characteristic of said crystal to said sweeps of frequencies to identify the shifted fundamental resonance frequency $f_{1c}$ and the shifted additional resonance frequency $f_{2c}$ for the crystal as it is being coated;

computing an areal mass density m of the coating of material on the crystal based on the initial resonance frequencies $f_{1u}$ and $f_{2u}$ for the crystal being coated;

computing the rate of material deposit based on changes in said areal mass density m for successive sweeps of frequencies; and controlling the rate of material deposition based on the computed rate of material deposit;

wherein said computing the areal mass density m is carried out by calculating parameters $R_{uncoated}$ and $R_{coated}$, where $$R_{uncoated} = \frac{f_{2u}^2 - f_{1u}^2}{f_{1u}^2}$$

and $$R_{coated} = \frac{f_{2c}^2 - f_{1c}^2}{f_{1c}^2};$$

applying these parameters to the following approximation to determine a value (mz) which is the product of the mass area density m times the acoustic impedance ratio z of the coating of the deposited material relative to the piezoelectric crystal:

$$\frac{R_{coated}^2}{R_{uncoated}^2} = (1 - mz)^{-1},$$

applying the value mz to the Lu-Lewis relation to obtain the value z:

$$z = -\frac{\tan(mz \cdot \pi \cdot f_{1c}/f_{1u})}{\tan(\pi \cdot f_{1c}/f_{1u})}; \text{ and}$$

calculating the areal mass density m from the value z and frequency shifts.

3. The method of claim 1 wherein said piezoelectric crystal is an AT-cut quartz crystal.

4. The method of claim 3 wherein said quartz crystal is plano convex.

5. A method of measuring and or controlling the rate of material deposition onto a piezoelectric crystal that has a fundamental resonance frequency $f_1$ and at least one additional resonance frequency $f_2$ next above said fundamental resonance frequency, said fundamental and additional resonance frequencies having predetermined initial frequencies $f_{1u}$ and $f_{2u}$ prior to any material being deposited on the crystal, and shifting to lower frequencies $f_{1c}$ and $f_{2c}$ under mass loading of the crystals as the material is deposited thereon, wherein said resonances have mode assignments [1,0,0] and [1,0,2] which have indices to indicate the number of phase reversals along three crystal axes, and said fundamental resonances $f_1$ corresponds to a fundamental [1,0,0] mode of vibration for the crystal and the additional resonance frequency $f_2$ corresponds to an anharmonic [1,0,2] mode, the method comprising:

generating successive sweeps of frequencies in a frequency generator and applying said sweeps of frequencies to said crystal as said material is being deposited thereon;

analyzing a response characteristic of said crystal to said sweeps of frequencies to identify the shifted fundamental resonance frequency $f_{1c}$ and the shifted additional resonance frequency $f_{2c}$ for the crystal as it is being coated;

computing an areal mass density m of the coating of material on the crystal based on the initial resonance frequencies $f_{1u}$ and $f_{2u}$ for the uncoated crystal and the shifted resonance frequencies $f_{1c}$ and $f_{2c}$ for the crystal being coated;

computing the rate of material deposit based on changes in said areal mass density m for successive sweeps of frequencies; and controlling the rate of material deposition based on the computed rate of material deposit.

6. The method of claim 1 wherein said resonance frequencies $f_{1u}$, $f_{2u}$, $f_{1c}$, and $f_{2c}$ are measured to an accuracy of 15 Hz or better.

7. The method of claim 6 wherein said resonance frequencies are measured to an accuracy of within 1 Hz.

8. The method of claim 1 wherein a second material is deposited on the first mentioned deposited material on said crystal, and the method further comprising storing areal mass density $m_1$ for the first mentioned material; during the deposition of the second material repeating the steps of generating successive sweeps of frequencies, analyzing the response characteristics of the crystal to identify the frequencies $f_{1c}$ and $f_{2c}$, and computing the areal mass density for the aggregate of the first and second materials; and computing the areal density $m_2$ for the second material from the mass area densities $m_1$ and m.

* * * * *

UNITED STATES PATENT AND TRADEMARK OFFICE
CERTIFICATE OF CORRECTION

PATENT NO. : 5,112,642
DATED : May 12, 1992
INVENTOR(S) : ABDUL WAJID

It is certified that error appears in the above—identified patent and that said Letters Patent is hereby corrected as shown below:

Col. 12, line 33, after "density", insert --m--.

Signed and Sealed this

Sixth Day of July, 1993

Attest:

MICHAEL K. KIRK

Attesting Officer    Acting Commissioner of Patents and Trademarks